United States Patent [19]
Cornell

[11] 3,867,292
[45] Feb. 18, 1975

[54] AQUARIUM FILTER SYSTEM
[75] Inventor: James H. Cornell, Eugene, Oreg.
[73] Assignees: Darrel Michael Whitsell; Darrell Melvin, both of Springfield, Oreg.
[22] Filed: Apr. 10, 1973
[21] Appl. No.: 349,757

[52] U.S. Cl.............. 210/169, 210/293, 210/489
[51] Int. Cl............................................. E04h 3/20
[58] Field of Search .......... 210/169, 194, 197, 293, 210/489; 119/5

[56] References Cited
UNITED STATES PATENTS

| | | | |
|---|---|---|---|
| 2,676,921 | 4/1954 | Vansteenkiste | 210/169 |
| 2,871,820 | 2/1959 | Hayden | 210/169 UX |
| 2,935,199 | 5/1960 | Willinger | 210/169 |
| 3,119,774 | 1/1964 | Arak | 210/169 |
| 3,529,574 | 9/1970 | Kelely | 210/169 X |
| 3,720,318 | 3/1973 | Cohen | 210/169 |
| 3,720,319 | 3/1973 | White | 210/169 |

Primary Examiner—Theodore A. Granger
Attorney, Agent, or Firm—Clarence A. O'Brien; Harvey B. Jacobson

[57] ABSTRACT

A unique aquarium filter system is provided comprising a filter element of polyurethane or other open pore material covering the bottom area of an aquarium, and with a plurality of passageways underlying the filter element each communicating with an appropriate pump, and a layer of fine grain sand or the like is on top of the filter element to define a nitrifying bed. The passageways cover a substantial area beneath the filter element, whereby the water is drawn through the element and the sand over effectively the entire area thereof to prevent the buildup of undesired bacteria, or the like.

2 Claims, 11 Drawing Figures 3,867,292
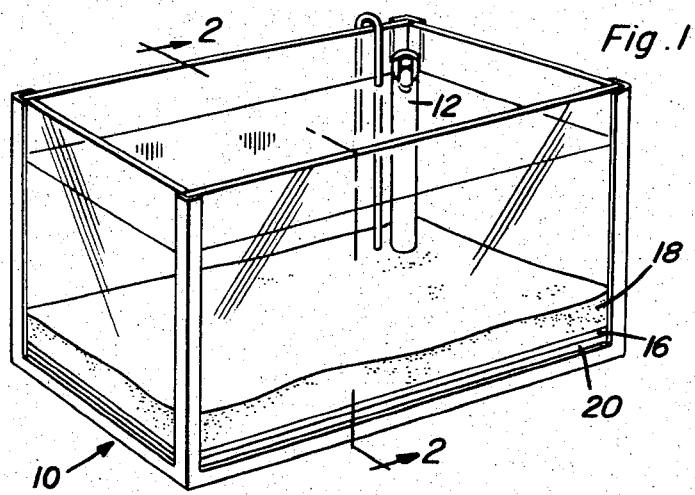
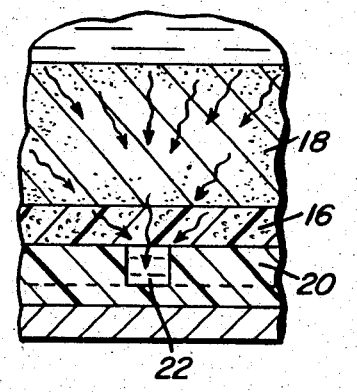
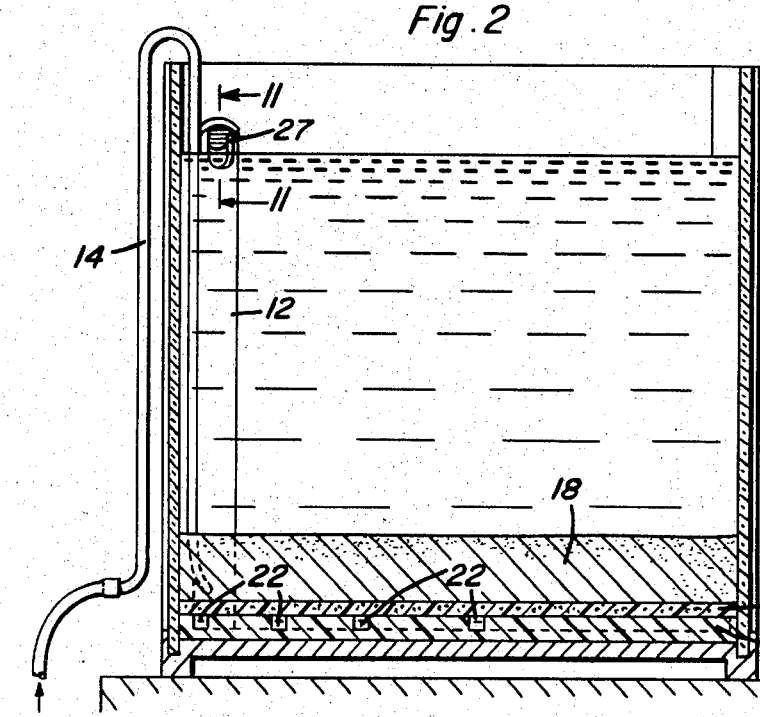
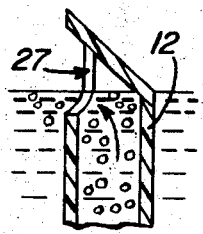
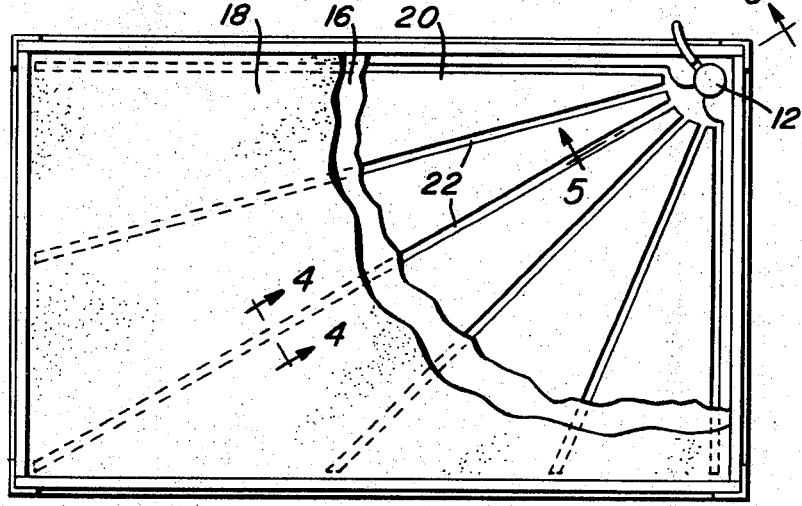

AQUARIUM FILTER SYSTEM

The present invention is generally related to liquid filters and, more particularly, to an improved filter system for aquariums.

In the past, various filter constructions have been proposed or manufactured for cleaning water in aquariums or fish tanks. One of the more common conventional filters included a submerged container filled with activated charcoal and fiber glass or cotton, through which the water was continually passed to provide the desired filtering. With such conventional constructions, it was necessary that the filter materials be replaced periodically. Furthermore, the circulation of the water in most cases was more or less concentrated in the area of the filter container, leaving "dead spots" at various locations in the aquarium, particularly in the gravel or sand bottom. Other aquarium filter arrangements have been proposed to provide more uniform circulation, but such, for the most part, have met with only marginal success as they leave "dead spots" in the sand or they are impractical to clean, requiring that the tank be emptied.

It is an object of the present invention to provide a novel aquarium filter system which overcomes the above-mentioned problems of conventional aquarium filter constructions.

Another object of the present invention is to provide a unique aquarium filter system which includes a filter element which covers substantially the entire bottom area of the aquarium with a network of fluid passageways underlying the filter element, whereby the water is drawn through substantially the entire filter element to eliminate "dead spots" and the undesirable bacteria associated therewith.

It is a further object of the present invention to provide a versatile aquarium filter system including a generally planar filter element of polyurethane, or other open pore material, which covers substantially the entire bottom area of the aquarium, with a layer of fine sand or the like on top of the filter element to remove larger contaminants from the water and to define a nitrifying bed of aerobic bacteria for enhancing the water quality.

Still another object of the present invention is to provide a novel aquarium filter system which provides uniform circulation of the water without "dead spots," whereby the buildup of anaerobic bacteria in the sand or gravel medium is prevented.

It is a further object of the present invention to provide a versatile aquarium filter system which is of relatively simple construction, durable, long lasting, easy to clean, yet economical to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a typical aquarium tank uitlizing the filter system of the present invention.

FIG. 2 is a sectional view taken along section 2—2 of FIG. 1.

FIG. 3 is a top plan view of the aquarium tank shown in FIG. 1 with sections removed to show the fluid passageway arrangement.

FIG. 4 is a sectional view taken along section 4—4 of FIG. 3.

FIG. 11 is a sectional view taken along section 11—11 of FIG. 2.

Figure 6:
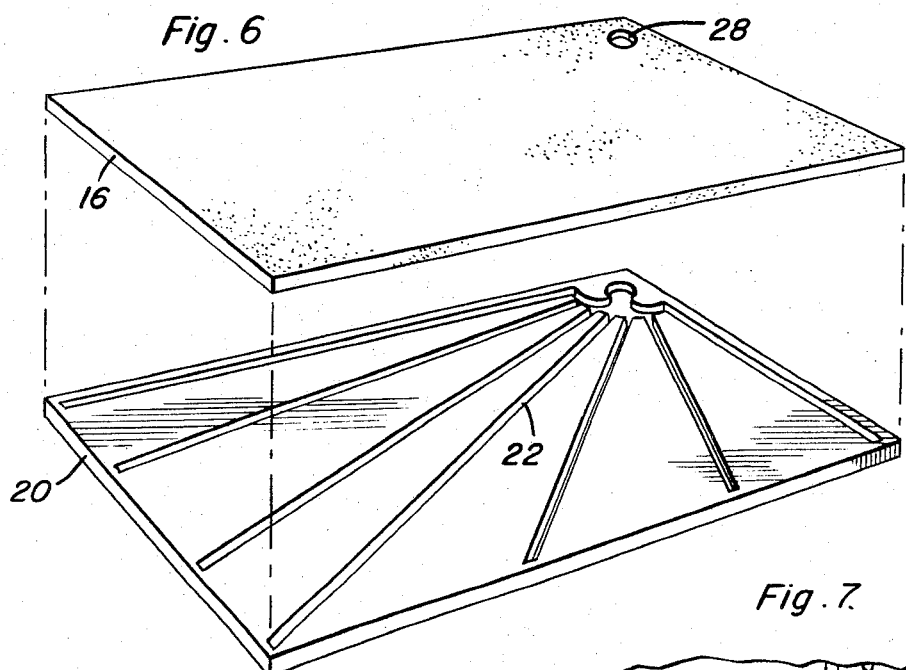
FIG. 6 is an exploded perspective view of the filter element and base member associated with the present invention.

Referring now, more particularly, to FIGS. 1-3 of the drawings, a typical aquarium tank utilizing the filter system of the present invention is generally indicated by the numeral 10 and is of a conventional type and configuration. The tank is provided with a circulation pump, preferably of the air bubble type, including an elongated tubular housing 12 which is vertically disposed in a corner area of the tank and is connected to an air delivery tube 14 which extends over one wall of the tank and is appropriately connected to a conventional air pump, not illustrated. The air is forced through delivery tube 14 to the bottom area of tubular housing 12. Air bubbles move upwardly through the interior of the tubular housing, thereby causing circulation of the water within the aquarium tank sufficient for filtering purposes.

It will be appreciated that the filter system of the present invention includes a generally planar filter element 16 mounted in the bottom region of the aquarium tank. The filter element is made of open-pore material through which the water may be passed with a minimum amount of resistance, but sufficient to provide a filtering action to remove fine particles or contaminants from the water. Preferably, the filter element is made of open-pore foam polyurethane which has excellent filtering qualities, and is ideal for marine application. The filter element covers substantially the entire bottom surface area of the tank and is covered by a layer of fine sand 16, or other granular material, which is effective to remove larger contaminants during the filtering operation. Preferably, the sand is of No. 30 grain size or smaller to provide the desired filtering action. Filter element 16 rests upon a base member 20 which is flush with the bottom of aquarium tank 10 and which is provided with a plurality of elongated indentations 22 defining fluid passageways for the water as it is circulated during the filtering operation. The fluid passageways 22 underlie filter element 16 and are in direct fluid communication with tubular housing 12 associated with the circulation pump.

Figure 5:
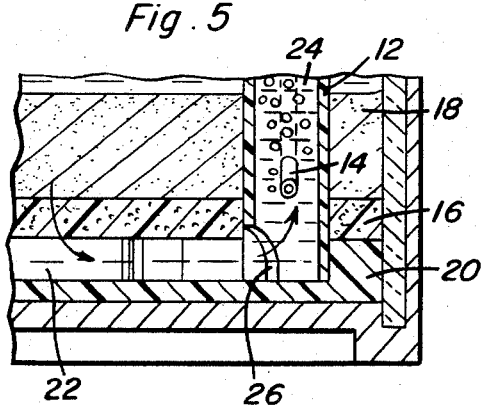
FIG. 5 is a sectional view taken along section 5—5 of FIG. 3.

With particular reference to FIG. 3, it will be observed that fluid passageways 22 diverge outwardly from tubular housing 12 to define a network of paths which underlie filter element 16 and filter sand 18. This provides a uniform draw or pull of the tank water through filter element 16 and sand layer 18 when the circulation pump is operated. The sand and filter element provide a dispersing action for the vacuum created in the underlying passageway, such that the aquarium water is drawn through the sand and filter element over a substantially large surface area which approximates the entire bottom surface of the aquarium tank. This circulatory action is best shown by FIG. 4, with the arrows illustrating movement of the water to the associated passageway 22. Since the fluid passageways are large in number and spaced apart from each other by relatively short distances, the circulation pump provides a substantially uniform flow of aquarium water through the sand layer and filter element. This eliminates "dead spots" in the sand which with conventional filter systems caused buildups of anaerobic bacteria which was most harmful to the water quality. Since the filter system of the present invention provides continuous circulation of the water through sand layer 18, the sand layer provides a nitrifying bed of aerobic bacteria which significantly improves the quality of the aquarium water as it is ideal for handling fish waste materials and the like.

with particular reference to FIGS. 5 and 11, it will be appreciated that the lower end of air delivery tube 14 passes through the wall of tubular housing 12 to provide a constant flow of air bubbles 24 which rise in a column within the tubular housing. The lower end of tubular housing is provided with an inlet opening 26 in direct communication with each fluid passageway 22. The rising action of the bubbles causes a vacuum at the lower end of tubular housing 12 which creates a pulling action upon the water in each fluid passageway 22 and forces the water in the tubular housing upward and through an outlet opening 27 to the tank water proper.

With particular reference to FIG. 6, it will be observed that filter element 16 is of generally planar configuration and is of appropriate size and shape to cover the bottom of the aquarium tank. An aperture 28 is provided at one corner of the filter element to permit passage of tubular housing 12 to base member 20 during assembly of the filter system. Base member 20 is of similar size and shape as filter element 16 and, preferably, is formed from plastic or other noncorrosive materials. The base member is of sufficient thickness to define fluid passageways 22 of adequate depth and cross-sectional area. Of course, it is not intended that the filter system of the present invention be limited to the fluid passageway configuration illustrated in FIGS. 1-6 or that it be limited to the formation of the passageways in the base member 20.

Figure 7:
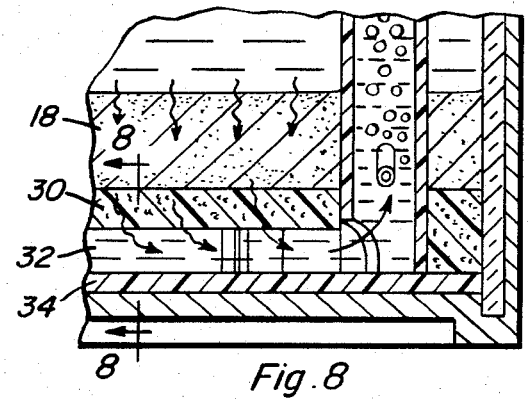
FIG. 7 is a partial sectional view of a second form of the aquarium filter system of the present invention.
Figure 8:
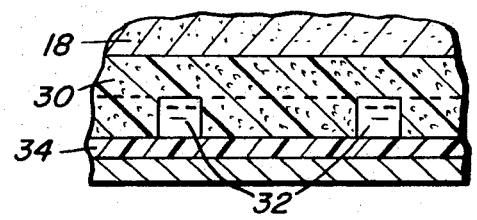
FIG. 8 is a sectional view taken along section 8—8 of FIG. 7.

With reference to FIG. 7, second forms of the filter element and base member are illustrated and include a filter element 30 of the same materials and configuration as filter element 16 described above, but provided with a plurality of indentations or grooves formed on its lower side to define fluid passageways 32. With the fluid passageways 32 formed in the filter element, a base member 34 is provided which includes a flat or planar upper surface which supports the lower surfaces of the filter element. The operation of this form of the invention is identical to that of the first-described form illustrated in FIGS. 1-6 and provides a similar uniform circulation through the sand layer and filter element under the influence of the bubble pump action.

Figure 9:
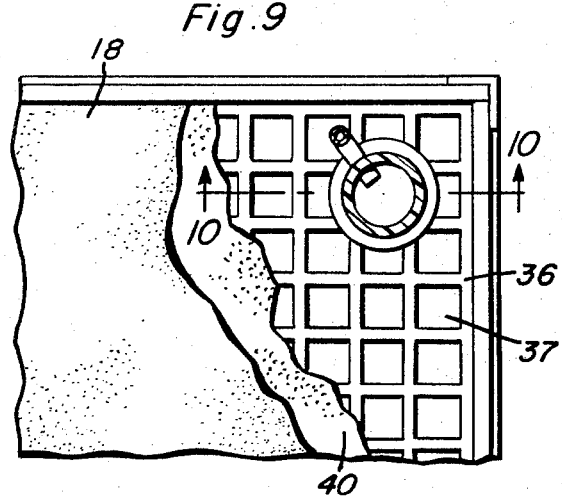
FIG. 9 is a partial plan view of a third form of the filter system of the present invention with sections removed.
Figure 10:
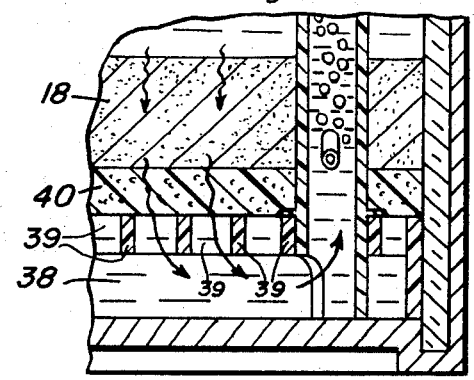
FIG. 10 is a sectional view taken along section 10—10 of FIG. 9.

With reference to FIGS. 9 and 10, a third form of the filter element and base member is illustrated and includes a base member 36 spaced above the bottom of aquarium 10 and defining a fluid passageway 38. The base member has a plurality of openings formed therein and defined by vertical baffle members 39 intersecting one another to define a gridwork of said openings which communicate with the fluid passageway 38 underlying the area of the base member 36. The filter element indicated at 40 is of generally planar configuration, such as that illustrated at 16 in FIGS. 1-6. By providing a large number of fluid ports or paths, the uniformity with which the water is circulated through the sand and underlying filter element is further enhanced, to provide the above-described advantages.

From the foregoing descriptions, it will be appreciated that the aquarium filter system of the present invention provides a relatively simple yet highly versatile and highly reliable means of cleaning aquarium waters. During the filtering operation, larger contaminants accumulate on the upper surfaces of the sand layer such that they may be conveniently removed by a fine mesh net, or the like, without significantly stirring up the waters and without having to drain the tank, as with most conventional filter systems. Also, the large number of fluid passageways underlying the polyurethane filter element provide uniform circulation of the water through the sand layer to prevent "dead spots" which normally encourage the growth of an anaerobic bacteria. With the water continuously circulating through the sand layer, a field of aerobic bacteria is developed within the sand layer in a relatively short period of time. This provides a nitrifying bed which is capable of handling fish waste materials to transform such to nitrites, nitrates and byproducts which are harmless to most aquarium fishes. Preferably, the polyurethane filter element is approximately one-fourth to three-eighths inch thick, with the overlying sand being of No. 30 grain size or finer and approximately 1 inch in depth. The filter is instrumental in removing very fine particles from the water which are not removed by the sand layer. Since the surface area of the filter element is considerably large relative to the water volume, it provides an extremely large filter surface area which does not require cleaning or replacement for a period of several years subsequent to installation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an aquarium, a filter system comprising: an open-pore polyurethane filter element of generally planar configuration positioned in the bottom region of the aquarium, a plurality of liquid passageways formed as a plurality of regularly spaced openings in a supporting member underlying said filter element, a layer of sand of at least as fine as No. 30 grain size overlying said filter element, pump means for drawing a liquid through said layer of sand and subsequently through said filter element into said passageways, said passageways being in direct communication with said pump means which includes a tubular housing disposed vertically within said aquarium, having an inlet opening at the lower end thereof in fluid communication with said liquid passageways to draw liquid therefrom, and an outlet opening at the top end thereof for returning liquid to the aquarium proper, said sand layer further defining a nitrifying bed containing aerobic bacteria, said filter system further including a generally planar base member spaced above the bottom of the aquarium and comprising vertical baffle members intersecting one another to define a gridwork of openings throughout the entire area of the planar base member.

2. The aquarium combination of claim 1 wherein said layer of No. 30 grain size sand is approximately 1 inch in depth overlying said polyurethane foam filter of approximately one-fourth to three-eights inches in thickness.

* * * * *